United States Patent
Hammad et al.

(10) Patent No.: US 11,004,056 B2
(45) Date of Patent: May 11, 2021

(54) MIXED MODE TRANSACTION PROTOCOL

(75) Inventors: Ayman Hammad, Pleasanton, CA (US); Patrick L. Faith, Pleasanton, CA (US)

(73) Assignee: Visa International Service Association, San Francisco, CA (US)

( * ) Notice: Subject to any disclaimer, the term of this patent is extended or adjusted under 35 U.S.C. 154(b) by 280 days.

(21) Appl. No.: 13/338,108

(22) Filed: Dec. 27, 2011

(65) Prior Publication Data

US 2013/0006847 A1 Jan. 3, 2013

Related U.S. Application Data

(60) Provisional application No. 61/428,815, filed on Dec. 30, 2010.

(51) Int. Cl.
*G06Q 20/32* (2012.01)
*G06Q 20/20* (2012.01)
(Continued)

(52) U.S. Cl.
CPC ............ *G06Q 20/32* (2013.01); *G06Q 20/20* (2013.01); *G06Q 20/382* (2013.01); *G06Q 20/425* (2013.01)

(58) Field of Classification Search
CPC ...... H04Q 3/0045; H04W 76/15; H04W 4/14; H04M 1/72552; G06Q 20/425
(Continued)

(56) References Cited

U.S. PATENT DOCUMENTS 6,295,448 B1 9/2001 Hayes, Jr. et al.
6,587,835 B1 7/2003 Treyz et al.
(Continued)

FOREIGN PATENT DOCUMENTS

JP 2007/058757 A 3/2007
KR 10/2006/0135340 A 12/2006
(Continued)

OTHER PUBLICATIONS

Mixed-mode transactions: Appendix A: Asynchronous Procedures: infocenter.sybase.com/help/index.jsp?topic=/com.sybase.dc32518_1501/html/rsadmin_vol_2/rsadmin_vol_2367.htm; 1 page ; 2007.*
(Continued)

*Primary Examiner* — Christine M Behncke
*Assistant Examiner* — Mary M Gregg
(74) *Attorney, Agent, or Firm* — Kilpatrick Townsend & Stockton LLP

(57) ABSTRACT

As opposed to using one type of technology from the beginning of a transaction to the end of a transaction at the point of sale, embodiments of the present invention are related to useful techniques for conducting mixed mode transactions. A mixed mode transaction combines at least two modes of communication used in transaction processing. A transaction may start by initiating the transaction using a first communication mode between a first device and a second device. The first device may be a consumer's mobile device, and the device may be a merchant access device or point of sale terminal. To continue the transaction, a second mode of communication may be initiated. The first and second communications modes may be a physical interaction-based mode, a contact or contactless chip mode, a Bluetooth mode, a WiFi mode, an infrared (IR) mode, or any other suitable communication mode.

25 Claims, 8 Drawing Sheets

(51) Int. Cl.
  *G06Q 20/42* (2012.01)
  *G06Q 20/38* (2012.01)
(58) Field of Classification Search
  USPC .............................................................. 705/3
  See application file for complete search history.

(56) References Cited

U.S. PATENT DOCUMENTS

| | | | |
|---|---|---|---|
| 7,089,208 | B1 | 8/2006 | Levchin et al. |
| 7,167,710 | B2* | 1/2007 | Thakkar ............ H04M 3/42382 |
| | | | 455/450 |
| 7,366,522 | B2 | 4/2008 | Thomas |
| 7,420,464 | B2 | 9/2008 | Fitzgerald et al. |
| 7,427,926 | B2 | 9/2008 | Sinclair et al. |
| 7,463,143 | B2 | 12/2008 | Forr et al. |
| 7,575,177 | B2 | 8/2009 | Killian et al. |
| 7,774,231 | B2 | 8/2010 | Pond et al. |
| 8,255,323 | B1 | 8/2012 | Casey et al. |
| 9,226,135 | B2* | 12/2015 | Hamada ................ H04W 72/02 |
| 9,842,213 | B2* | 12/2017 | Dadu .................... G06F 21/575 |
| 2001/0047488 | A1 | 11/2001 | Verplaetse et al. |
| 2003/0005118 | A1* | 1/2003 | Williams ................ H04L 63/08 |
| | | | 709/225 |
| 2003/0212601 | A1* | 11/2003 | Silva et al. ..................... 705/17 |
| 2004/0029569 | A1* | 2/2004 | Khan ..................... G06Q 20/02 |
| | | | 455/414.1 |
| 2004/0132461 | A1* | 7/2004 | Duncan ...................... 455/456.1 |
| 2005/0037774 | A1* | 2/2005 | Scott .................. G06Q 30/0601 |
| | | | 455/456.1 |
| 2005/0246292 | A1* | 11/2005 | Sarcanin ............... G06Q 20/02 |
| | | | 705/67 |
| 2006/0154606 | A1* | 7/2006 | Scott .................. G06Q 30/0601 |
| | | | 455/41.2 |
| 2006/0165060 | A1* | 7/2006 | Dua ........................ G06Q 20/20 |
| | | | 370/352 |
| 2006/0186994 | A1 | 8/2006 | Lin et al. |
| 2006/0256074 | A1 | 11/2006 | Krum et al. |
| 2006/0265238 | A1 | 11/2006 | Perrier |
| 2006/0282662 | A1* | 12/2006 | Whitcomb .............. G06F 21/33 |
| | | | 713/156 |
| 2007/0003061 | A1 | 1/2007 | Edward et al. |
| 2007/0008133 | A1 | 1/2007 | Kang |
| 2007/0171848 | A1* | 7/2007 | Fujii et al. ...................... 370/310 |
| 2007/0188323 | A1* | 8/2007 | Sinclair ................ G06F 21/445 |
| | | | 340/568.1 |
| 2007/0213045 | A1 | 9/2007 | Hermansson et al. |
| 2007/0223476 | A1 | 9/2007 | Fry |
| 2008/0001712 | A1* | 1/2008 | Agarwal et al. ............. 340/10.1 |
| 2008/0041936 | A1 | 2/2008 | Vawter |
| 2008/0051059 | A1* | 2/2008 | Fisher .......................... 455/410 |
| 2008/0081608 | A1* | 4/2008 | Findikli et al. ............... 455/425 |
| 2008/0147461 | A1 | 6/2008 | Lee et al. |
| 2008/0175443 | A1 | 7/2008 | Kahn et al. |
| 2008/0249864 | A1 | 10/2008 | Angell et al. |
| 2009/0013087 | A1* | 1/2009 | Lorch ................ H04M 1/72552 |
| | | | 709/232 |
| 2009/0065575 | A1 | 3/2009 | Phillips et al. |
| 2009/0066647 | A1 | 3/2009 | Kerr et al. |
| 2009/0143104 | A1 | 6/2009 | Loh et al. |
| 2009/0153342 | A1 | 6/2009 | Thorn |
| 2009/0167486 | A1 | 7/2009 | Shah et al. |
| 2009/0192937 | A1 | 7/2009 | Griffin et al. |
| 2009/0228513 | A1* | 9/2009 | Tian ................... G06F 17/30525 |
| 2009/0235074 | A1* | 9/2009 | Salgarelli et al. ............. 713/169 |
| 2009/0262069 | A1 | 10/2009 | Huntington |
| 2009/0320123 | A1 | 12/2009 | Yu et al. |
| 2010/0082490 | A1* | 4/2010 | Rosenblatt et al. ............ 705/64 |
| 2010/0125508 | A1* | 5/2010 | Smith .................... G06Q 20/10 |
| | | | 705/16 |
| 2010/0274722 | A1* | 10/2010 | Roberts .................. G06Q 20/10 |
| | | | 705/44 |
| 2010/0303230 | A1* | 12/2010 | Taveau ................... G06Q 20/02 |
| | | | 380/30 |
| 2010/0311330 | A1* | 12/2010 | Aibara et al. ................. 455/41.2 |
| 2011/0029400 | A1 | 2/2011 | Scipioni |
| 2011/0055255 | A1* | 3/2011 | Shaw ...................... H04W 4/02 |
| | | | 707/769 |
| 2011/0189981 | A1* | 8/2011 | Faith et al. ................. 455/414.1 |
| 2011/0213977 | A1* | 9/2011 | Little .................... H04L 9/0844 |
| | | | 713/171 |
| 2012/0040717 | A1* | 2/2012 | Levy et al. ................. 455/556.1 |

FOREIGN PATENT DOCUMENTS

| | | |
|---|---|---|
| KR | 10/2007/0045765 A | 5/2007 |
| KR | 10/2010/0097644 A | 9/2010 |
| WO | 2004/062131 A1 | 7/2004 |
| WO | 2009/105115 A2 | 8/2009 |
| WO | 2010/039337 A2 | 4/2010 |

OTHER PUBLICATIONS

"New ARM9-Based Embedded Processor from Cirrus Logic Combines Improved Horsepower, Integrated Features for less Cost" by High Tech Writers; 3 pages; www.thefreelibrary.com/New+ARM9-Based+Embedded+Processor+from+Cirrus+L' May 18, 2004.*

Difference Between RFID and NFC: by DifferenceBetween.net; 3 pages; Oct. 17, 2009; www.differencebetween.net/technology/difference-between-rfid-and-nfc/.*

Near Field Communications by Steve Rackley; Sep. 1, 2010; 6 pages ; low-powerdesign.com/article_NFC_rackley.htm.*

IEEE P802.11n/D3.00 Sep. 2007 (Year: 2007).*

Non final Office Action on U.S. Appl. No. 12/952,811, filed Nov. 23, 2010. dated Nov. 20, 2012. 15 pages.

Fisher, Jon, "The next Bump Technologies should bump Sequoia," Jon Fisher Blog: The next Bump Technology; http://blogspot.com/../next-bump-technology, (Apr. 13, 2010), 2 pages.

PayPal iPhone App update on Mar. 17, 2010, iTunes Screen shot, (retrieved from: iTunes > App store > Finance > PayPal, an eBay Company), 1 page.

International Search Report and Written Opinion, dated Jul. 26, 2011 in PCT/US2010/057997, 8 pages.

International Search Report and Written Opinion, dated Jul. 27, 2011 in PCT/US2010/058014, 9 pages.

International Search Report and Written Opinion, dated Aug. 25, 2011 in PCT/US2010/058005, 8 pages.

International Search Report and Written Opinion, dated Aug. 2, 2011 in PCT/US2010/058016, 9 pages.

International Search Report and Written Opinion, dated Aug. 29, 2012 in PCT/US2011/067421, 3 pages.

Matt Hamblen, Bump App Draws Buzz at CTIA, Oct. 8, 2009, 8 pages.

Final Office Action dated May 15, 2013 for U.S. Appl. No. 12/953,372, 11 pages.

* cited by examiner

MIXED MODE TRANSACTION PROTOCOL

CROSS-REFERENCES TO RELATED APPLICATIONS

The present application is a non-provisional application of and claims priority to U.S. Provisional Application No. 61/428,815, filed on Dec. 30, 2010, the entire contents of which are herein incorporated by reference for all purposes.

BACKGROUND

Financial transactions using a portable consumer device may be conducted in different ways. For example, a portable consumer device with a magnetic stripe may be swiped by a magnetic reader. Alternatively, a portable consumer device may be "waved" near a contactless terminal. Visa Paywave is an example of a contactless transaction. Chip-cards that require physical contact with a reader, or closer physical proximity, may also be used. A portable consumer device may have infrared capabilities.

Some mobile devices may be portable consumer devices that are used for financial transactions. Cellular phones, portable music players, handheld global positioning system (GPS) devices, personal digital assistants, and other mobile devices have become popular among the general public. Mobile devices may have integrated contactless or contact chips and may be used at a point of sale device. Some mobile devices may include integrated accelerometers and/or integrated GPS units to determine the location of the device.

Magnetic, contact, contactless, and wireless communication means each have disadvantages when used alone in portable consumer devices. Embodiments of the present disclosures relating to mixed mode transactions address these disadvantages and problems.

BRIEF SUMMARY

Embodiments of the invention are directed to systems, apparatuses, and methods for conducting a mixed mode financial transaction. A mixed mode transaction combines at least two modes of communication used in transaction processing. A transaction may start by initiating the transaction using a first communication mode and be continued using a second mode of communication.

As opposed to using one type of technology from the beginning of a transaction to the end of a transaction at the point of sale (e.g., magnetic stripe technology only, contactless technology only, etc.), embodiments of the present invention are related to useful techniques for conducting mixed mode transactions. A transaction may start by initiating the transaction using a first communication mode between a first device and a second device. The first device may be a consumer's mobile device, and the device may be a merchant access device or point of sale terminal. To continue the transaction, a second mode of communication may be initiated. The second mode of communication may be dependent on the first mode or independent of the first device. The first and second modes of communication may be operated simultaneously. The first and second communications modes may be a physical interaction-based mode, a contact or contactless chip mode, a Bluetooth mode, a WiFi mode, an infrared (IR) mode, or any other suitable communication mode.

An embodiment of the invention is directed to method of conducting a mixed mode financial transaction between a first device and a second device comprising: initiating, with the first device, the financial transaction using a first communication mode between the first device and the second device, wherein the first device and the second device are proximate to each other; sending first transaction data using the first communication mode; initiating a second mode of communication; and continuing the transaction by sending second transaction data using the second communication mode, wherein the first device and the second device are proximate to each other.

An embodiment of the invention is directed to a mobile device comprising: a processor; a memory coupled to the processor; a first communication interface, wherein a transaction at a merchant device is initiated by sending first transaction data using a first communication mode via the first communication interface; and a second communication interface, wherein the transaction continues by sending second transaction data using a second communication mode via second communication interface and wherein the mobile device and the merchant device are proximate to each other.

These and other embodiments of the invention are described in further detail below.

BRIEF DESCRIPTION OF THE DRAWINGS

The disclosure, together with further advantages thereof, may best be understood by reference to the following description taken in conjunction with the accompanying drawings in which.

DETAILED DESCRIPTION

Figure 1:
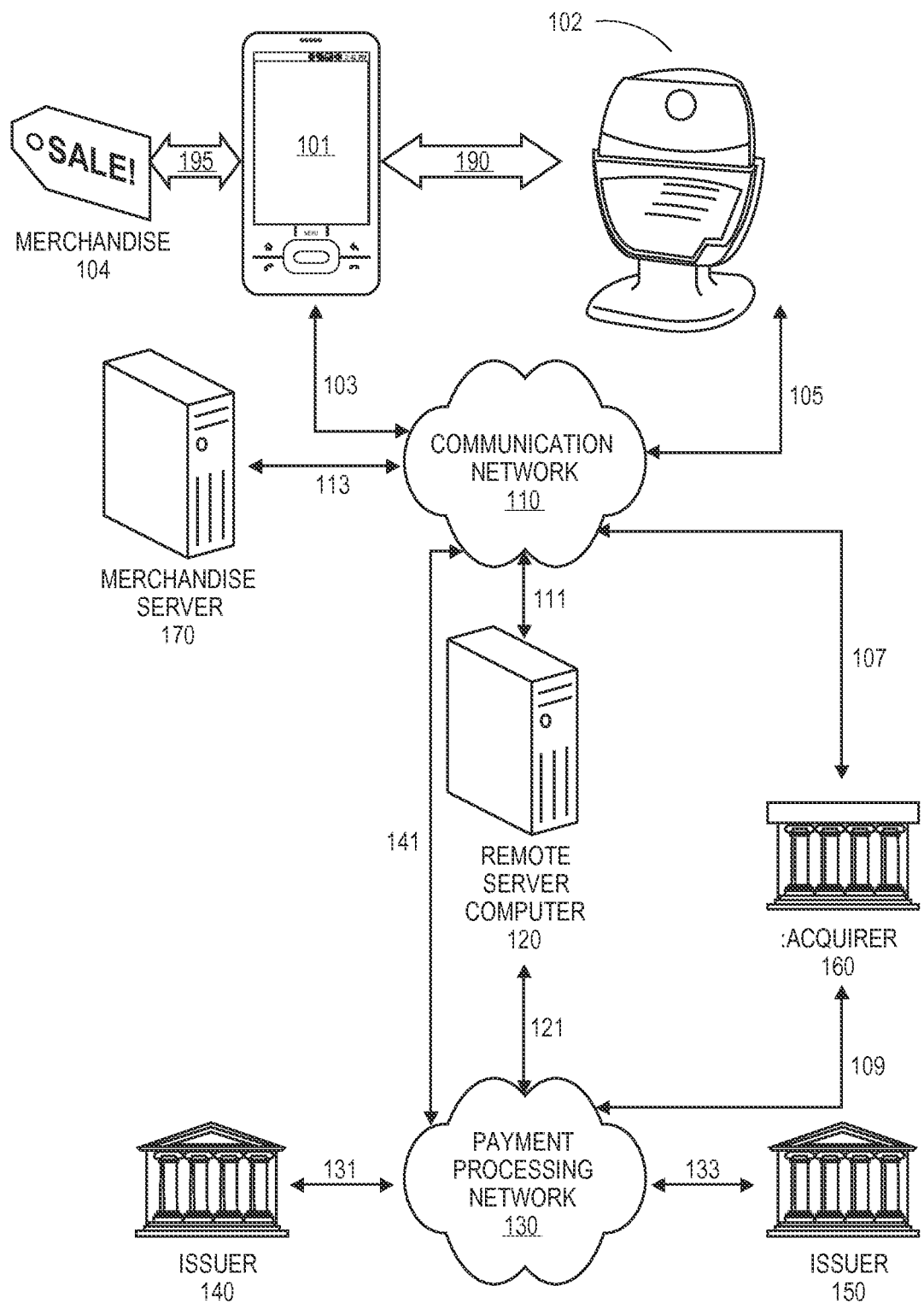
FIG. 1 is a high level diagram illustrating one embodiment of a system in accordance with the present disclosure.

Embodiments of the present invention relate to methods, systems, devices for mixed mode transaction processing. As used herein, a "mixed mode transaction" combines at least two modes of communication used in transaction processing. The following chart shows some of the exemplary combinations of communications modes that may be used to conduct a transaction in accordance with an embodiment of a mixed mode transaction protocol of the present invention. Many variations are possible.

| Mode A | Mode B |
|---|---|
| Physical interaction-based mode | Physical interaction-based mode |
| Contact chip | Contact chip |
| Contactless chip (RF) | Contactless chip (RF) |

| Mode A | Mode B |
|---|---|
| Bluetooth | Bluetooth |
| WiFi | WiFi |
| Infrared (IR) | Infrared (IR) |
| Other | Other |

For example, a first stage of a transaction may use wireless communications initiated after a physical interaction (e.g., bump, tap, or shake movement) between a payee and a payor device, where the physical interaction generates interaction data that is used in the communication process. A second stage of the transaction may use contactless technology. Therefore, a transaction may use at least two different modes of communication. The second stage of the transaction may use any suitable second mode of communication, including but not limited to contactless, contact chip, Bluetooth, WiFi, Infrared (IR), or another mode of communication. The first stage of the transaction may include waking up, initializing the devices, and/or authenticating the devices, and the second stage may include the initiation or generation of an authorization request message or authorization response message, sending of a receipt of confirmation, authenticating the devices, etc.

In one embodiment, a first stage of a transaction may use contact chip technology. In another example, the first mode may be a contactless mode. Regardless of whether the first mode is based on a contact or contactless technology, the second mode may use Bluetooth, WiFi, a physical interaction-based mode, infrared, or another mode of communication.

The transaction may be completed with a second mode of communication. In one embodiment, the second mode of communication is used after the transaction is authorized by an issuer. In one embodiment, the second mode of communication is used before the transaction is authorized by an issuer or in order to obtain the issuer's approval.

In one embodiment, the second mode of communication is used simultaneously with the first mode of communication or substantially simultaneously. For example, the first and second mode of communication may be initialized at the same time, or within a very short period of time (0-1 seconds).

In one embodiment, the second mode of communication is used after the first mode of communication is initiated. For example, the first mode of communication may start, and thereafter the second mode of communication may start. After the second mode of communication has started, the first mode of communication may still be used and maintained in some embodiments, while in other embodiments, the first mode of communication is no longer used or maintained after the second mode of communication has commenced.

In some embodiments, a first stage of the transaction may be conducted using a first communications mode, and a second stage of the transaction may be conducted using a second communications mode. The first stage of the transaction may use a physical interaction-based wireless communication mode, and second stage may use a short range wireless communication mode. The short range communication may be a contactless technology. The first stage of the transaction may be related to payment authorization and therefore may require added security. The second stage of the transaction may be related to a receipt or other transaction information that poses less of a data security concern. The second stage may be related to less sensitive information. Therefore, the second stage may use a contactless mode for information that is less sensitive.

In some embodiments, the first mode of communication is the primary mode of communication, and the second mode of communication is a fallback mode of communication. The "fallback" mode of communication is a backup mode of communication in the event that the primary mode of communication cannot be used under the circumstances. For example, if the physical interaction-based wireless communication mode fails for some reason, an alternative technology may be used to process the transaction. The physical interaction-based wireless communication mode might experience technical difficulties, for example, if there is no cellular data network (3G, 4G, etc.) or WiFi network coverage.

Exemplary Systems and Devices

FIG. 1 is a high level diagram illustrating one embodiment of a system 100 capable of performing the disclosed method. The system 100 includes a payor (consumer) device 101, a payee (merchant) device 102, a communications network 110, a remote server computer 120, a payment processing network 130, account issuers 140 and 150, and an acquirer 160. Devices 101 and 102 may be used to make and receive payments and may be linked to financial accounts maintained by financial institutions (issuers, acquirers, etc.).

The consumer device 101 and the merchant device 102 may conduct a mixed mode transaction, as described herein. The components illustrated in FIG. 1 and recited above may be in operative communication with each other via communication channels, depicted as arrows 103, 105, 107, 109, 111, 113, 121, 131, 133, and 141. Many types of data may be exchanged through the communications channels shown, including but not limited to authorization request messages, authorization response messages, authentication data, merchandise data, identification data, etc.

In one embodiment, a transaction is initiated with a first device, such as the consumer device using a first communication mode between the first device and the second device. The first device and the second device may be proximate in location to each other. The first device sends first transaction data using the first communication mode. First transaction data may include an identifier for the first device, a transaction request message, or an identifier for the merchant and/or merchant terminal. Any suitable data may be sent as first transaction data, including an authorization request message, authentication data (tokens, signed hashes, encryption keys, encrypted data), etc.

When the devices are at or near the same location, the devices are proximate to each other. However, whether devices are proximate or not depends on application. In contact chip card embodiments, the distance between two proximate devices is small or zero. In contactless or RFID embodiments, the distance between two proximate devices may be larger (e.g., 5 cm or 20 cm, less than 1-2 m). Similarly, for other communications modes, proximity may be larger. Bluetooth may have a proximity of about 10 m, and WiFi might have a proximity range of 10 m or more.

A second mode of communication may also be initiated. In one embodiment, the second mode of communication is initiated simultaneously with the first mode of communication, and second transaction data using the second transaction mode is communicated. Second transaction data may be an authorization request message, authentication data (tokens, signed hashes, encryption keys, encrypted data), an authorization response message, a transaction receipt, etc.

In one embodiment, the second mode of communication is initiated after the first mode of communication is initiated, and the transaction is continued by sending second transaction data using the second communication mode. In one embodiment, a second mode of communication is initiated after the first mode of communication is initiated, and the transaction is continued by sending data using the second communication mode in addition to the first communication mode. The first device and the second device may be proximate to each other when communicating using the second communication mode.

Using the first or second mode, or both, a payment authorization request is generated and an authorization response message is generated, as described herein. In some embodiments, the device 102 may be operated by a merchant, and the merchant may have an acquiring bank. In this embodiment, the authorization request message may be sent to the payment processing network 130 by acquirer 160 via communication channel 105, 107. Acquiring bank (or "acquirer") 160 forwards the authorization request to the payment processing network 130 via 109. The authorization request message is then forwarded by the payment processing network 130 to the issuer 140 of the transaction account associated with mobile device 101. After the issuer 140 receives the authorization request message, issuer 140 may then authorize or decline the transaction. The transaction may be approved or declined due to a number of factors (e.g., the creditworthiness of the consumer, the risk of fraud, etc). The issuer 140 may generate an authorization response message, indicating whether or not the current transaction is authorized, and sends this back to the payment processing network 130.

After merchant device 102 receives the authorization response message (from acquirer 160 via communication network 110), merchant device 102 may then provide the authorization response message for the payor. The response message may be displayed by mobile device 101 (payor) or merchant device 102 (payee). In some embodiments, a transaction receipt, which may be itemized, may be sent to at least one of the mobile device 101 or merchant device 102. The transaction receipt may be sent via email, text message, or an application alert. In some embodiments, mobile device 101 may receive the authorization response message instead of, or in addition to, the merchant device 102.

In one embodiment, the authorization request message is sent to the issuer 140 of the transaction account associated with the mobile device 101. In other embodiments, the payor may specify the transaction account from which funds should be withdrawn. Then, the payor may send this information to the payment processing network 130 via communication channels 103, 111 and remote server computer 120. The payment processing network 130 may then receive the account information provided by the payor, and determine the issuer that issued the transaction account. In one embodiment, the issuer can be determined based on the account number. After the issuer 140 receives the authorization request message, the issuer 140 sends an authorization response message back to the payment processing network 130 to indicate whether or not the current transaction is authorized. The payment processing network 130 then forwards the authorization response message back to the merchant device 102.

Issuer 140, holding the payor's transaction account, may receive the request for the transfer of funds from the payor's transaction account. After verifying that the account is valid, and that sufficient funds or credit exists to make the payment, issuer 140 may respond (131) to the payment processing network 130, indicating that the transaction may proceed.

At the end of the day, a normal clearing and settlement process can be conducted by the payment processing network 130. A clearing process is a process of exchanging financial details between an acquirer and an issuer to facilitate posting to a consumer's account and reconciliation of the consumer's settlement position. Clearing and settlement can occur simultaneously.

A payment authorization request message may include a payor personal account number (PAN), risk score, fraud protection data, payee PAN, transaction ID, transaction details, and payor and payee information. A payor PAN includes account number information of the payor. The payment authorization request message may also include a risk score, indicating the credit risk of the payor. The risk score may be used by the receiving financial institution to make a determination of whether to accept or deny the transaction.

Transaction details may include transaction amount, merchant category code, service code, or other information. Transaction details may also be used to calculate a risk score. The authorization request message may also include additional information such as the card verification value, expiration date, or equivalent. Transaction details may further include information about the funds transfer such as amount of funds transfer, currency, exchange rate, etc. Even though the payment authorization message is described as including certain information, one skilled in the art will realize that other types of information in lieu of or in addition to the information described may be included in the authorization request message.

The payment processing network 130 may include data processing subsystems, networks, and operations used to support and deliver authorization services, exception file services, and clearing and settlement services. An exemplary payment processing system may include VisaNet™. Payment processing systems such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 130 may include a server computer. A server computer is typically a powerful computer or cluster of computers. For example, the server computer can be a large mainframe, a minicomputer cluster, or a group of server computers functioning as a unit. In one example, the server computer may be a database server computer coupled to a Web server computer. The payment processing network 130 may use any suitable wired or wireless network, including the Internet.

The payment processing network 130 may request a transfer of funds from the issuer 140 that has issued the payor's transaction account. After verifying that the account is valid, and that sufficient funds or credit exists to make the payment, the issuer 140 may respond (131) to the payment processing network 130 indicating that the transaction may proceed. Upon receipt of the message indicting that the transaction may proceed (131), the payment processing network 130 may receive funds from the payor's transaction account. In one embodiment, the received funds may be temporarily stored in a generic holding account at the payment processing network 130 prior to being transferred to the issuer of the payee's account. In another embodiment, the funds may be temporarily stored in a holding account that is associated with the issuer 150 of the payee's account, but not specifically associated with the payee's account.

In some embodiments, the merchant device 102 may be associated with an issuing bank 150, where deposits or credits can be made to an account at the issuing bank 150. The payment processing network 130 may then push the funds received from the payor's transaction account into the account specified by the payee. The payment processing network may send a message to the issuer 150 of the account specified by the payee requesting that the funds received be transferred from the account in which they are being held temporarily, into the account that the payee has specified. Again, the payment processing network 130 is capable of this transaction because it contains payment authorization, clearing, and settlement services.

After the funds have been deposited into the account specified by the payee, the issuer 150 may send a response message 133 to the payment processing network 130 indicating the successful transaction. Upon receipt of the message indicating a successful transaction, the payment processing network 130 may send a message to the payee indicating that the funds have been received and deposited into the specified account. The payment processing network 130 is capable of requesting funds directly from the issuer because, as mentioned above, it contains payment authorization, clearing, and settlement services.

Although only a single issuer is shown for each of the mobile device 101 and the merchant device 102, it would be clear to a person of skill in the art that mobile device 101 and merchant device 102 could be associated with any number of transaction accounts that are issued by any number of issuers. For example, mobile device 101 may be associated with a credit card account maintained by one issuer and a debit card account maintained by a different issuer. This would allow a user to choose which transaction account to use in the transaction. Therefore, a user could make all payments with a credit account and receive all payments directly into a checking account. Likewise, device 102 may be linked to multiple transaction accounts from multiple issuers and/or an acquirer. In some embodiments, the mobile 101 and merchant device 102 may both be associated with transaction accounts issued by the same issuer.

Merchandise 104 may be read with the consumer's device 101 using an RFID reader, barcode scanner, or a camera on the phone (195). The system may include merchandise server computer 170, which stores information regarding merchandise offered by the merchant. Merchandise information may include price, offers, promotions, descriptions, photos, reviews, etc. The merchandise server computer 170 may store information for product comparison purposes.

Exemplary Mixed Mode Variations

Figure 2:
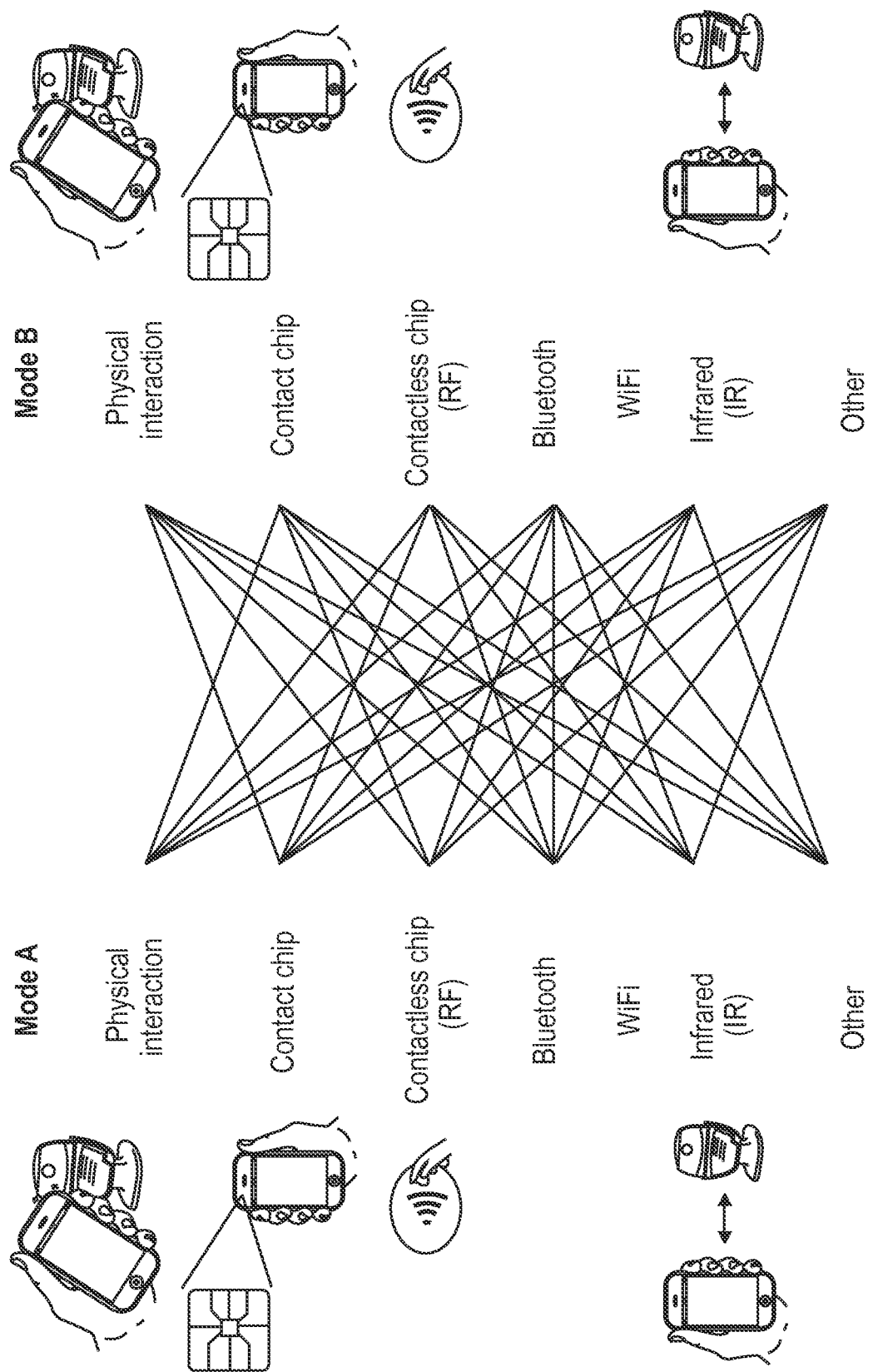
FIG. 2 is a high level diagram illustrating various combinations of a first communication mode and a second communication mode in accordance with the present disclosure.

FIG. 2 shows exemplary combinations of first communication modes and second communication modes. In a mixed mode transaction, the first mode may be any mode from the first column, and the second mode may be any different mode from the second column. There are many combinations of first modes and second modes.

The first mode may be a physical interaction-based mode, and the second mode may be a contact chip, contactless chip (RF), Bluetooth, WiFi, infrared (IR), or other mode. In this embodiment, the transaction is initiated by a consumer device 101 with a motion sensor (e.g., accelerometer) making physical contact, such that accelerometer data may be generated, with a merchant device 102 with a motion sensor. Interaction data may be generated based on the physical contact. The interaction data may uniquely identify the event. Transaction data and interaction data may be exchanged. The transaction may proceed using a second mode of communication.

The first mode may be a contact chip mode, and the second mode may be physical interaction-based mode, contactless chip (RF), Bluetooth, WiFi, infrared (IR), or other mode. In this embodiment, the transaction is initiated by a consumer device 101 with a contact chip card making contact with a merchant device 102 capable of reading contact chip cards. Data may be generated based on the contact chip scan/read. The data may uniquely identify the event. Transaction data may be exchanged using contact chip card technology. Data from the contact ship may be used to lookup the consumer mobile device 101 and initiate the second mode of communications. The transaction may proceed using a second mode of communication.

The first mode may be a contactless chip (RF) mode, and the second mode may be a physical interaction-based, contact chip, Bluetooth, WiFi, infrared (IR), or other mode. In this embodiment, the transaction is initiated by a consumer device 101 with a contactless chip "waiving" the device within close proximity of a merchant device 102 with a contactless reader. Data may be generated based on the contactless scan/read. The data may uniquely identify the event. Transaction data may be exchanged using contactless technology. Data from the contactless ship may be used to lookup the consumer mobile device 101 and initiate the second mode of communications. The transaction may proceed using a second mode of communication.

The first mode may be a Bluetooth mode, and the second mode may be physical interaction-based mode, contact chip, contactless chip (RF), WiFi, infrared (IR), or other mode. In this embodiment, the transaction is initiated by a consumer device 101 and a merchant device 102 communicating via Bluetooth. While communicating using Bluetooth, the consumer device 101 or the merchant device 102 may start a transaction by selecting a "Check out" option, or the like. Data may be generated based on the Bluetooth communication. The data may uniquely identify the communication session. Transaction data may be exchanged using Bluetooth technology. The transaction may proceed using a second mode of communication.

The first mode may be a WiFi mode, and the second mode may be a physical interaction-based, contact chip, contactless chip (RF), Bluetooth, infrared (IR), or other mode. In this embodiment, the transaction is initiated by a consumer device 101 and a merchant device 102 communicating using WiFi. While communicating, the consumer device 101 or the merchant device 102 may start a transaction by selecting a "Check out" option, or the like. Data may be generated based on the WiFi communication. The data may uniquely identify the communication session. Transaction data may be exchanged using WiFi technology. The transaction may proceed using a second mode of communication.

The first mode may be infrared (IR) mode, and the second mode may be physical interaction-based, contact chip, contactless chip (RF), Bluetooth, WiFi, or other mode. In this embodiment, the transaction is initiated by a consumer device 101 with IR-capabilities making contact with a merchant device 102 with IR-capabilities. The data may uniquely identify the event. Transaction data may be exchanged using IR technology. The transaction may proceed using a second mode of communication.

The first mode may be any suitable other mode of communication, and the second mode may be a physical interaction-based mode, contact chip, contactless chip (RF), Bluetooth, WiFi, or infrared (IR) mode. For example, the other mode of communication might use a wireless USB standard. In this embodiment, the transaction is initiated by a consumer device 101 or a merchant device 102 using a first mode of communication. In another example, the first mode of communication may be a swipe of a card with a magnetic stripe. The information on the magnetic stripe may be used to initiate communications with the consumer mobile device 101. The transaction may proceed using a second mode of communication.

Any suitable second mode of communication may be used. In one embodiment, the second mode is dependent on data (e.g., security tokens, devices identifiers) exchanged in the first mode of communication. In another embodiment, the second mode is independent on data exchanged in the first mode of communication. In some applications, this makes the transaction more secure since two separate authentication mechanisms must be compromised to breach security measures. Whether or not the first and second modes of communication are dependent or independent may depend on type of transaction and/or acceptable level of risk. Another advantage is that mixed mode transaction permits two types of validation—one using each mode.

Physical Interaction-Based Embodiment

Wireless communications may be initiated after a physical interaction between a payee device and a payor device. For example, a consumer (payor) device with an accelerometer may "bump" or "tap" a merchant (payee) device with an accelerometer to initiate a financial transaction (190). The consumer device may be a phone, and the merchant device may be a POS terminal. Each of the devices may have a motion sensor, such as an accelerometer. Once it has been determined that the merchant device and the consumer device physically interacted, the transaction may continue.

Financial transactions between two devices with accelerometers (or other motion sensors) are described in U.S. application Ser. No. 12/952,811, titled "Transaction Using a Mobile Device with an Accelerometer" and filed on Nov. 23, 2010, and U.S. application Ser. No. 12/953,368, titled "Interaction Terminal" and filed on Nov. 23, 2010. These applications are hereby incorporated by reference in their entirety for all purposes. This mode of communication, based on physical interactions between devices, is referred to as a "physical interaction-based wireless communication" mode.

In a physical interaction-based wireless communication mode, a consumer may have a mobile device with software adapted to detect physical interactions between a phone and merchant device, such as a point of sale (POS) terminal. In one embodiment, a remote server computer determines whether two devices physically interacted using interaction data. In one embodiment, the merchant device may comprise software adapted to detect physical interactions between the merchant device and the consumer device. The physical interaction-based embodiment may be referred to here as a "bump" interaction, although it is understood that other types of physical interaction could also be used.

When the consumer mobile device "bumps" or "taps" the merchant device, the consumer mobile device and the merchant device generate interaction data representative of the physical interaction between the mobile device and the merchant device. Using respective interaction data, the server computer (e.g., remote server 120) determines that the two devices (101, 102) physically interacted. Interaction data may include, for example, motion sensor (e.g., accelerometer) data, location data (e.g. GPS or cellular tower triangulation), time data, etc. The server computer may use first interaction data received from a mobile device and second interaction data received from a merchant device to determine whether the mobile device and the merchant device interacted. The server computer may compare motion, location, and/or time data from respective consumer mobile devices and merchant devices to determine whether the devices physically interacted.

Location data may be GPS data or any other data that describes the location of a device at a given time (e.g., WiFi positioning or cellular network positioning). Time data may include timestamps or timestamp data, which is a numeric value that represents a time that an event occurred, and/or duration data (e.g., the duration or length of time a device was still or near motionless, the length of time a device was continuously moving, or duration of physical contact). Accelerometer data may include numeric values representing the magnitude and direction of the acceleration as a vector quantity. Interaction data may further include the geographic location of the device at the time of an interaction or attempted interaction. Interaction data may include data from motion sensors or pressure sensors in addition to, or in lieu of, accelerometer data from an accelerometer.

First Exemplary Transaction with First and Second Mode

Figure 3A:
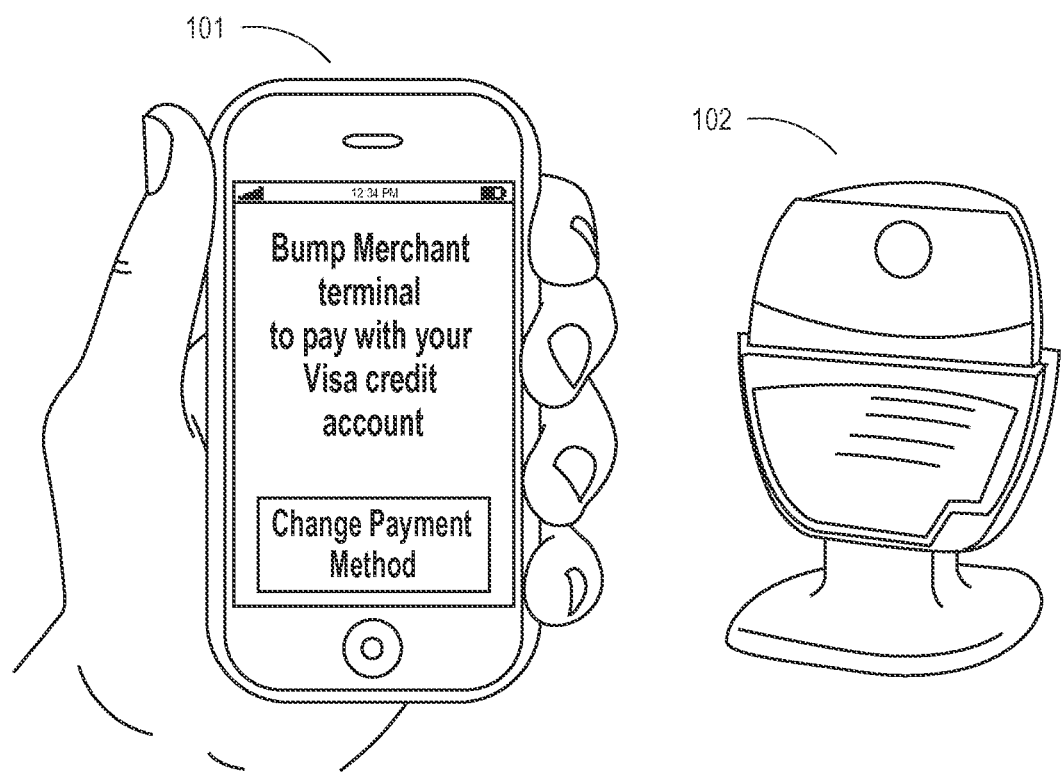
FIGS. 3A-C are high level diagrams illustrating an embodiment of a mobile device and a merchant device in accordance with the present disclosure.
Figure 3B:
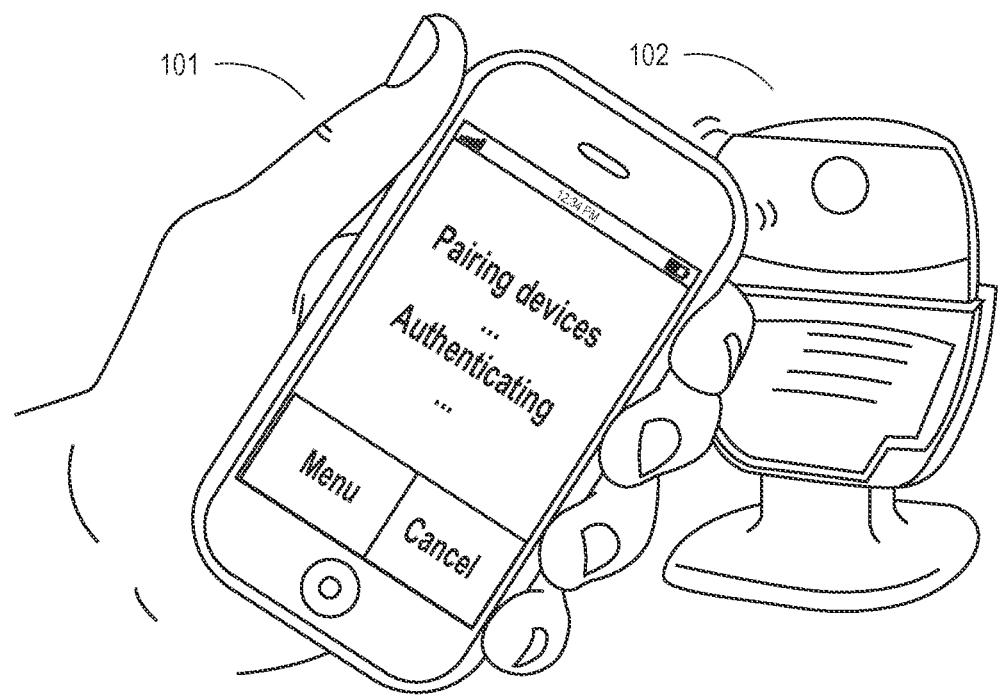
Figure 3C:
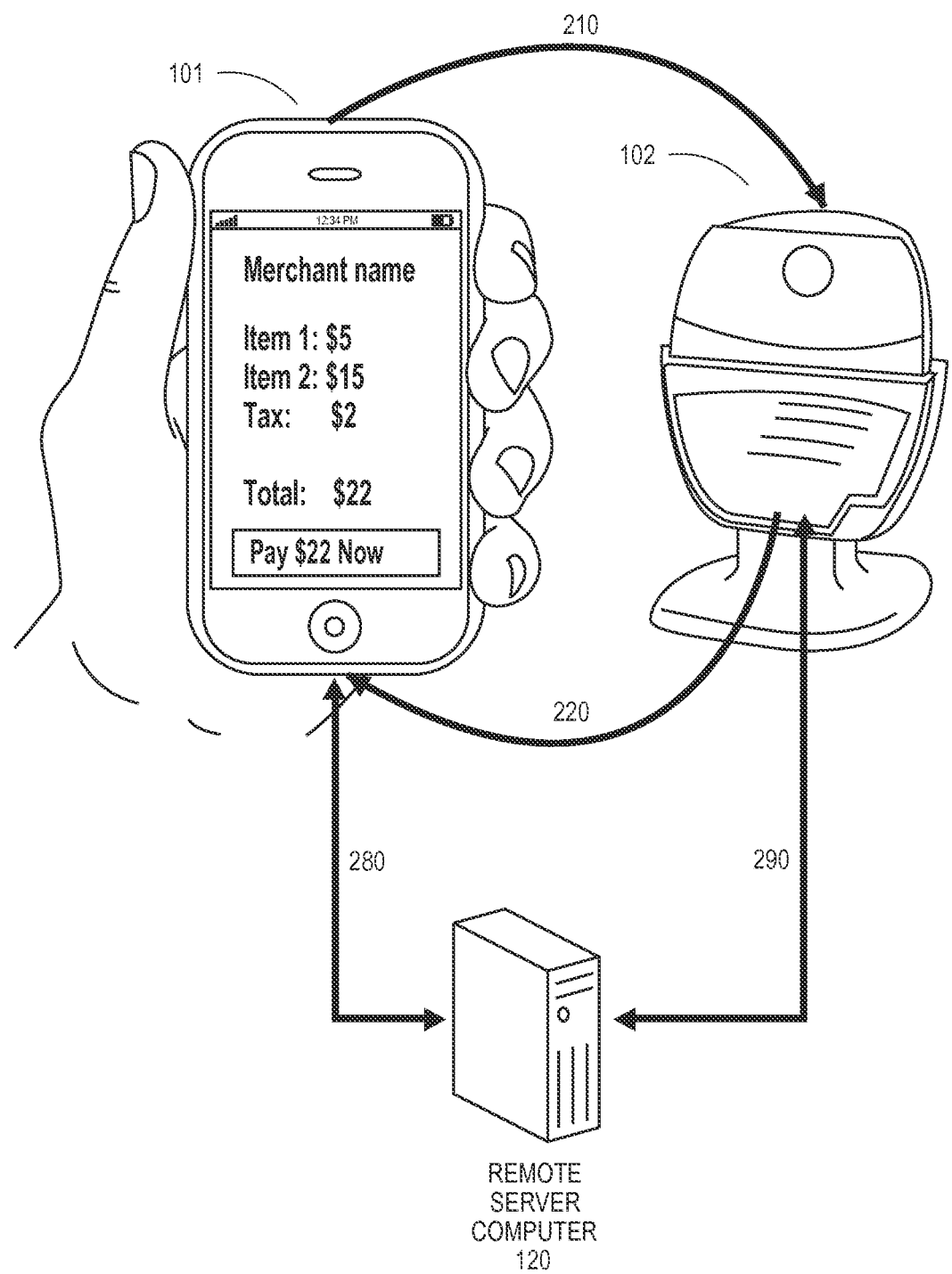

FIGS. 3A-C illustrate one embodiment of a consumer device 101 and a merchant device 102 conducting a mixed mode transaction in accordance with the invention. The first mode in FIGS. 3A-C is a physical interaction-based wireless communication mode. The second mode may be any other suitable mode. A payment transaction may be processed using a combination of the first mode and the second mode. The transaction processing system may include a payment network, such as VisaNet, and the sending of an authorization request message.

FIG. 3A shows the consumer device 101 and the merchant device 102 immediately before starting the mixed mode transaction. The consumer device 101 and the merchant device 102 have not yet made physical contact. The consumer may cause the consumer device 101 to make physical contact with the merchant device 102 in order to start a transaction, or vice-versa. This may occur when a consumer enters a merchant's location (e.g., merchant terminal near entrance of the merchant's store), when a consumer wishes to checkout of the merchant's location (e.g., at the checkout line), or any time in between (e.g., at a terminal located elsewhere in the store). The consumer device 101 and the merchant device 102 may comprise the elements described in FIG. 7 below.

The consumer device and/or the merchant terminal may have a user interface with instructions for how to initiate the transaction. In FIG. 3A, the user interface of consumer device 101 has instructions stating, "Bump Merchant terminal to pay with your Visa credit account." The user interface also has an option to change payment method, for example, from credit account to debit account. Any suitable options may be presented using the user interface.

FIG. 3B shows the consumer device 101 making physical contact with the merchant device 102. Interaction data, representative of the physical contact between the consumer device 101 and the merchant device 102, is recorded by motion sensors in the devices (e.g., an accelerometer, GPS components, etc.). The physical contact may be a bump, tap, or shake movement. Any physical interaction where interaction data can be generated in both devices is suitable. In one embodiment, the interaction data of the consumer device 101 comprises accelerometer data, location coordinates, and a time stamp. In one embodiment, the interaction data of the merchant device 102 comprises accelerometer data, location coordinates, and a time stamp.

Again, the consumer device and/or the merchant terminal may have a user interface with instructions or status information. In the embodiment shown, the consumer device states "Pairing devices" and "Authenticating." This is to indicate that the remote server 102 is determining whether or not the consumer device 101 and the merchant device 102 intentionally physically interacted. The remote server may also be determining the identity of each the consumer device 101 and the merchant device 102. The user interface may have other options or buttons, such as "Menu" or "Cancel." Any suitable options may be presented using the user interface.

FIG. 3C illustrates the mixed mode communications after the physical interaction depicted in FIG. 3B. In this embodiment, a first stage of a transaction uses wireless communications initiated after the physical interaction between the device. The interaction data of the consumer device 101 and the interaction data of the merchant device 102 may be sent to a remote server computer (120). The remote server may determine whether the consumer device 101 and the merchant device 102 physically interacted by comparing one or more of the interaction data.

If consumer device 101 and the merchant device 102 physically interacted, the devices may communicate with one another through a secure channel using the remote server 120 as a trusted intermediary. The consumer device 101 may send and receive data from the remote server computer 120 via communication channel 280, which may be a cellular data network channel or other network channel. The merchant device 102 may send and receive data from the remote server computer 120 via communication channel 290, which may be a cellular data network channel or other network channel.

A second stage of the mixed mode transaction may use a second mode of communication. In one embodiment, the mobile device and the merchant device may also have a short range communication transceiver using contactless technology or other short range communication mechanism. The consumer device 101 may send data to the merchant device 102 via communication channel 210 and receive data from the merchant device 102 via communication channel 220. Communication channels 210 and 220 may be based on standards related to contact chips, contactless (RF) chips, Bluetooth, WiFi, infrared, or other communication modes.

In one embodiment, the second mode of communication is based on contactless technologies. In one embodiment, the second mode of communication is based on Bluetooth technology. In one embodiment, the second mode of communication is based on WiFi technology. Initiation of the Bluetooth or WiFi communication channel may rely on data generated or exchanged between the consumer device and the merchant device using the first mode of communication. In one embodiment, the second mode of communication is used simultaneously with the first mode of communication or substantially simultaneously.

Second Exemplary Transaction with First and Second Mode

Figure 4A:
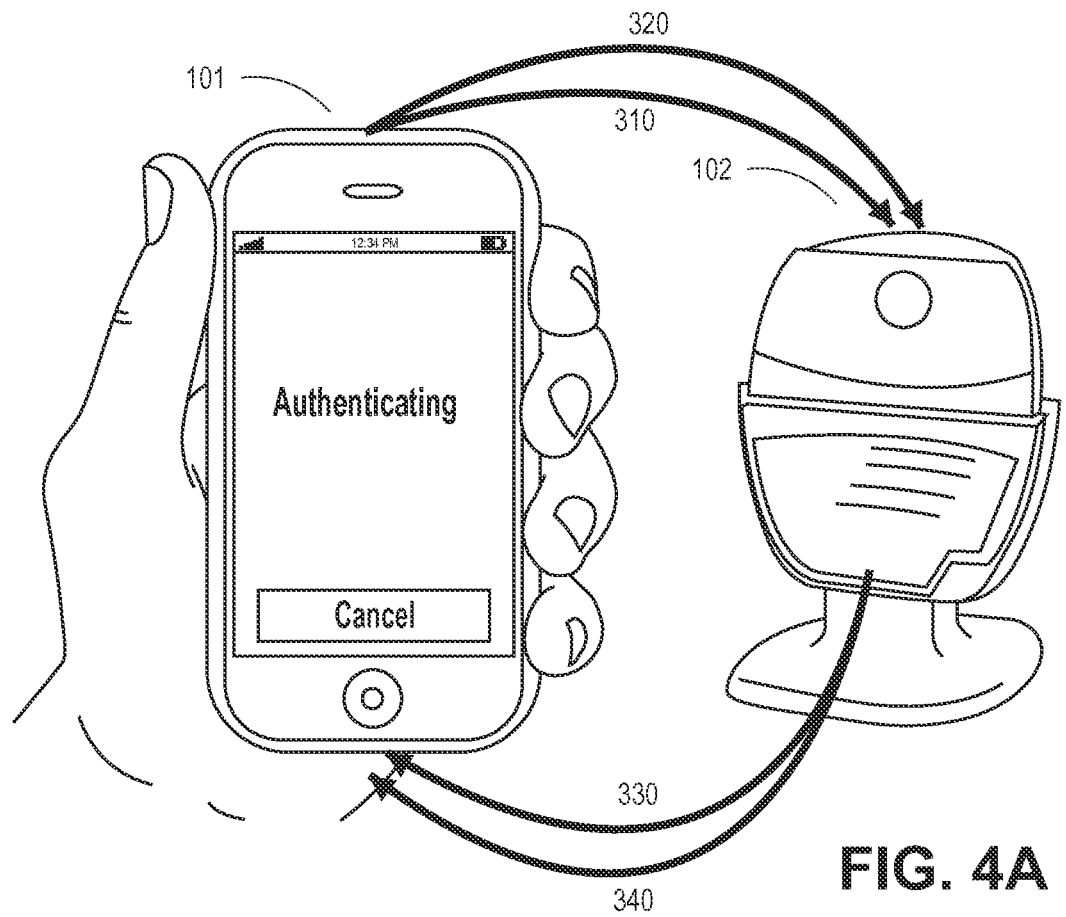
FIGS. 4A-B are high level diagrams illustrating an embodiment of a mobile device, a merchant device, and merchandise for sale in accordance with the present disclosure.
Figure 4B:
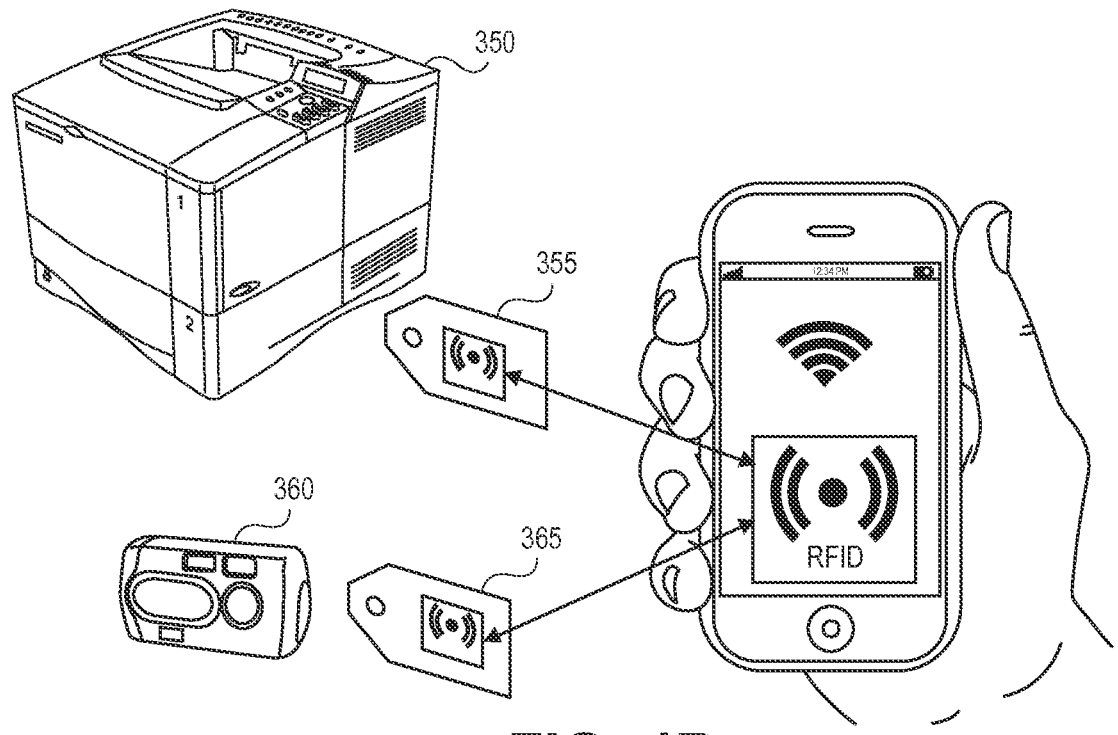

FIGS. 4A-B show one embodiment of a consumer device 101 and a merchant device 102 conducting a mixed mode transaction in accordance with the invention. The first mode in FIGS. 4A-B is a contactless communication mode. For example, in FIG. 1, the first mode of communication may be contactless (190) communication. The second mode may be any other suitable mode, including but not limited to Bluetooth or WiFi. A payment transaction may be processed using a combination of the first mode and the second mode.

In FIG. 4A, the transaction is initiated using contactless communication. The consumer device 101 and the merchant device 102 each comprise a contactless transmitter and receiver. The transaction is initiated using a first communication mode between the first device and the second device. The first device and the second device are proximate to each other. First transaction data may be sent using the first other. For example, consumer device 101 may send first transaction data to merchant device 102 using contactless channel 310. Merchant device 102 may send first transaction data to consumer device 101 using contactless channel 330.

A second mode of communication may be initiated. The transaction may continue by sending second transaction data using the second communication mode. Second transaction data may be sent using the second communication mode. For example, consumer device 101 may send second transaction data to merchant device 102 using a WiFi (or Bluetooth) channel 320. Merchant device 102 may send second transaction data to consumer device 101 using a WiFi (or Bluetooth) channel 340.

In one embodiment, the second mode is dependent on data exchanged (e.g., security tokens) in the first mode of communication. For example, the WiFi or Bluetooth connection may be set up based on data exchanged (e.g., security tokens) in the first mode of communication. The WiFi or Bluetooth set-up may create a private network for the consumer and the merchant to communicate data. In one embodiment, data generated or exchanged using the first mode may cross-pollinate the second mode (e.g., acceleration data from physical bump interaction). For example, the interaction data may be used to provide a unique initiator/seed point for the second mode (e.g., NFC), as opposed to a random number provided by the merchant terminal.

In one embodiment, the second mode is independent on data exchanged in the first mode of communication. In one embodiment, the second mode of communication is used simultaneously with the first mode of communication or substantially simultaneously.

FIG. 4B shows an embodiment where three modes of communication are used in a transaction. The first mode of communication (not shown) may be any suitable first mode to initiate the transaction, as described herein. For example, the first mode may be a physical interaction-based wireless communication mode. The consumer bumps a merchant terminal after arriving at the merchant store to start the transaction. The interaction data from the bump is used to set up a second mode of communication.

In the embodiment shown, WiFi is the second mode of communication, although any suitable second mode of communication may be used. The consumer device 101 may be connected to a merchandise server (170) at the merchant, which stores information about the products offered by the merchant.

The third mode of communication uses RFID tags (355, 365) to read product information associated with products for sale (350, 360) at a merchant location. RFID tags on products may be read using the consumer device 101 after the first and second modes of communication have been established.

In some embodiments, a mobile device comprising a product tag reader may be used by a consumer to read product information from products at a merchant retail location. For example, the mobile phone may have a RFID reader. The RFID reader may be configured to read product information contained in RFID tags when an accelerometer in the mobile device senses acceleration above a predetermined threshold. The RFID reader may be configured to read RFID tags within close proximity (e.g., 5 cm). The mobile phone may have other types of readers (e.g., barcode scanner, camera). After product information is read, the product information can be used for many useful purposes, including but not limited to: conducting price comparisons, obtaining product ratings, reviews, or nutritional information, generating product suggestions, sending offers or alerts to the consumer, etc.

After the consumer determines which of the products read/scanned by the mobile device that the consumer would like to purchase, the consumer may pay for the items using the mixed mode transaction processing, described above. For example, when ready to checkout, the consumer may "bump" a POS terminal to pay. In one embodiment, the consumer may waive the consumer device 101 near a contactless terminal. After the financial transaction is authorized using physical interaction-based wireless communication, the consumer may receive a receipt, coupons, etc. via a contactless communication.

Technical Advantages

One technical advantage to embodiments of the present invention is increased transaction and data security. Using two modes of communication with different and varying authentication requirements is more secure.

Data generated in the first mode of communication may provide an initiation point for the second mode of communication. In one embodiment, interaction data (e.g., accelerometer data, location coordinates, and a time stamp) may be used as a seed or initiation point for a second communication mode. In one embodiment, interaction data or a subset of interaction data may be used as a session key for communication between the mobile device and the merchant device in the second mode of communication. For example, the WiFi or Bluetooth session may be based in part on interaction data.

Data generated or exchanged using the first mode of communication may also be used to tie two devices (mobile device and merchant device) together. For example, in one embodiment, a unique value may be generated using a consumer device identifier and a merchant device identifier, and the unique value may be used as a seed, initiation point or session key for a second communication mode. The unique value may be based on interaction data.

A session key may be a single-use key used for encrypting all messages in one communication session. For example, the session key may be generated based on interaction data from interaction data, and the session key may be used to encrypt communications using the second communication mode. Any suitable encryption algorithms may be used, such as DES, triple DES (3DES), AES, etc. In another example, messages exchanged by the consumer device and merchant terminal may include signed hashes to ensure data security and that the communication has not been tampered with.

In embodiments where the first mode of communication uses a remote server, for example, when the first mode is a physical interaction-based mode, each of the consumer device and the merchant device can authenticate itself to the server. Then, trusting the server, the consumer device and the merchant device may exchange security tokens or session keys using the server. The security tokens or session keys may be used to, or in establishing, the second mode of communication. Once the server has resolved the relationship between the consumer device and the merchant device, and determined that the devices are authentic, the second mode of communication may start. In one embodiment, data exchange in the second mode of communication is more sensitive than data exchanged in the first mode of communication, and the second mode of communication is more secure.

One technical advantage to embodiments of the present invention is improved power consumption and increased battery life. The terminal wake up function can improve power consumption of devices and increase battery life of mobile devices not connected to a non-battery power source. Some communication modes require transmitting signals over the airwaves. For example, NFC uses radio frequency signals to communicate. Most NFC terminals in the United States are always on. Leaving the NFC receiver or transmitter on at all times wastes power and decreases battery life on a mobile device. NFC transceivers that are always on may contribute to interference with other devices; for example, in a large retail location where there are many NFC-compatible merchant devices. Moreover, certain regulations in Europe state that the NFC transceiver should not be left on when not in use. Bluetooth and WiFi also use the airwaves, and may present similar power consumption and interference concerns. The term "wireless transceiver" may be used herein to describe any suitable wireless transceiver, including but not limited to an NFC transceiver, Bluetooth transceiver, or WiFi transceiver.

In some applications, it is advantageous for devices to transmit and receive signals only when necessary. For example, it may be beneficial to only power on the wireless transceiver during a transaction and immediately before or after a transaction. In one embodiment, an instruction to activate the merchant device's wireless transceiver may be received and/or generated. For example, a merchant device may be a POS terminal with NFC. The POS terminal has a sleep function and only transmit when awake (i.e., when not in sleep mode). The POS terminal may exit sleep mode when a consumer device "bumps" the POS terminal. In one embodiment, the physical interaction can be the initiating act of a consumer device waking up the POS terminal. Upon an initiating act, the POS terminal may turn on its NFC transceiver, WiFi transceiver, or Bluetooth transceiver and start a dialogue between the consumer device and the merchant device.

One advantage to using a physical interaction-based mode as the first mode is that the interaction data generated by the devices can be used as a unique identifier for the session. Therefore, not only will the "bump" cause the transceiver to wake up, but it will also create a unique data value which may be used subsequently in the second communication mode. For example, if the second mode is an NFC mode, the merchant device may communicate only with the specific consumer device based on the unique session identifier.

Advantages to using a POS sleep mode include power consumption and battery life; and interference from other readers (e.g., checkout lines with many POS terminals). Further, there are advantages to using data generated or communicated in a first mode of communication to "wake up" a transceiver used in a second communication mode (as opposed to a simple "wake up" button). For example, unlike a simple "wake up" button, interaction data, for example, powers field and communicates data between two devices and may be used as seed data. A simple "wake up" button only powers field.

Other actions may cause the reader or wireless transceiver to wake up. For example, the first mode may be a contact chip card communication mode. After authentication of the contact chip card communication mode, the wireless transceiver on the merchant device and/or consumer device may be activated.

In one embodiment, a wireless transceiver activate message is sent from the consumer device to the merchant device or vice-versa. The wireless transceiver activate message may instruct the other device to turn on a particular transceiver, expect a certain transmission of data, or use a specific session key, token, or seed. For example, the first mode of communication may be used to send a wireless transceiver activate message that instructs a device to activate its Bluetooth, WiFi, or NFC transceiver. In another example, the first mode of communication may be used to send a wireless transceiver activate message that instructs a device to expect certain data from a specific source.

Exemplary Methods

Figure 5:
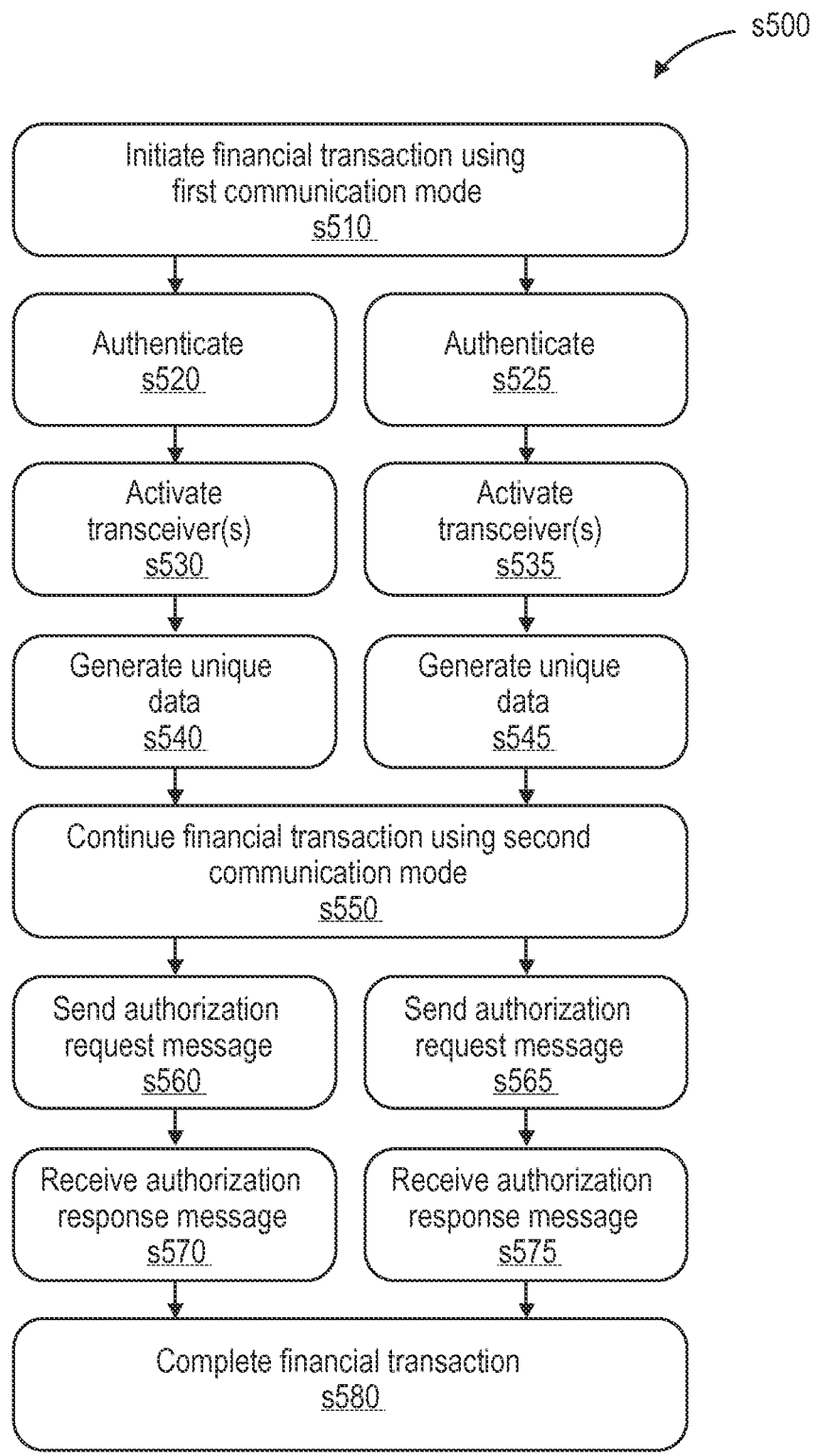
FIG. 5 shows a high level diagram illustrating a method in accordance with the present disclosure.

FIG. 5 shows a method s500 in accordance with the present invention. The left side of the diagram (s520, s530, s540, s560, s570) shows steps that may be conducted by a consumer mobile device. The right side of the diagram (s525, s535, s545, s565, s575) shows steps that may be conducted by a merchant device. Some steps may be conducted by either the consumer mobile device or the merchant device, for example, s510, s550, or s580. The order of the steps shown is exemplary only, and the steps may be performed in any suitable order without departing from the scope of the present invention. Similarly, although certain steps are shown, in some embodiments steps may be omitted.

In s510, a financial transaction is initiated using a first communication mode. For example, the initiation of a transaction may include the mobile device and the merchant device making physical contact as described in FIG. 3B. In one embodiment, the initiation of a transaction may include the mobile device and the merchant device exchanging information using contactless technologies as described in FIG. 4A (310, 330). The first communication mode may be a physical interaction-based mode, a contact or contactless chip mode, a Bluetooth mode, a WiFi mode, an infrared (IR) mode, or any other suitable communication mode.

In s520, the consumer mobile device may authenticate the merchant device. Likewise at s525, the merchant device may authenticate the consumer device. Authentication may occur locally or using a remote server computer trusted by each of the consumer mobile device and the merchant device.

In s530 and s535, respective transceivers in the consumer mobile device and the merchant device are activated. In one embodiment, activation of the transceivers may include powering up the transceivers or waking the transceivers up from sleep mode. In some embodiments, activation of the transceiver may include initializing settings and/or passcodes associated communicating using the transceiver. For example, a WiFi transceiver may require a network name and password or a Bluetooth transceiver may require a pairing code, passcode, etc.

In s540 and s545, unique data is generated based on data communicated or exchanged between the consumer mobile device and the merchant device. In some embodiments, these steps are performed by a remote server computer, rather than one or both of the consumer mobile device and the merchant device. Unique data is any data that ties the consumer mobile device and the merchant device together for a particular transaction. This can be used for non-repudiation. In one embodiment, unique data may be interaction data, as described above. In one embodiment, interaction data may be a combination of a consumer identifier and a merchant terminal identifier or merchant identifier. The consumer identifier may be any identifier that uniquely identifies the consumer, such as a primary account number, phone number, or the like. The merchant terminal identifier or merchant identifier may be any identifier that uniquely identifies the merchant or merchant terminal. In some embodiments, a unique data comprises a transaction identifier.

In s550, the transaction continues using a second communication mode. The second communication mode may be a physical interaction-based mode, a contact or contactless chip mode, a Bluetooth mode, a WiFi mode, an infrared (IR) mode, or any other suitable communication mode. In one embodiment, the second communication mode is a Bluetooth, WiFi, or contactless mode, as illustrated in FIG. 3C. In one embodiment, the second communication mode is a Bluetooth or WiFi mode, as illustrated in FIG. 4A.

In one embodiment, the second mode is dependent on data (e.g., security tokens) exchanged in the first mode of communication. In one embodiment, the second mode is independent on data exchanged in the first mode of communication. In some embodiments, communications using the first mode and the second mode occur simultaneously or substantially simultaneously.

In step s560, the consumer mobile device may send an authorization request message. In step s570, the consumer mobile device may receive an authorization response message. In some embodiments, the consumer mobile device may send the authorization request message (s560), but step s570 may be omitted and the merchant device may receive the authorization response message.

In step s565, the merchant device may send an authorization request message. In step s575, the merchant device may receive an authorization response message. As noted above, either of the consumer mobile devices can send the authorization request message, and either of the consumer mobile devices can send the authorization response message.

Either the consumer mobile device or the merchant device may initiate the sending of an authorization request message. Likewise, either the consumer mobile device or the merchant device may receive the authorization response message.

In the embodiment shown, the authorization request message and authorization response message are sent using the second mode of communication. However, it is understood that other process orders are possible. For example, the authorization request message may be sent using the first mode, and the authorization response message may be sent using the second mode. In some embodiments, the authorization request message and the authorization response message may be both sent using the first mode.

In step s580, the financial transaction is completed. In one embodiment, communications related to completing the financial transaction use the second mode of communication. In one embodiment, communications related to completing the financial transaction use the third mode of communication. A transaction receipt or other information may be sent to complete the transaction using a physical interaction-based, contact chip, contactless chip (RF), Bluetooth, WiFi, infrared (IR), or other modes.

One embodiment of the invention is directed to a method of conducting a mixed mode financial transaction between a first device and a second device. The method comprises initiating the financial transaction, using a first communication mode between the first device and the second device and completing the transaction using a second communication mode. The first communication mode may be based on a physical interaction (e.g., a bump) between the first device and second device. The second communication mode may be a contactless communication technology. The first device may be a merchant device and the second device may be a consumer's mobile phone.

Another embodiment of the invention is directed to a system for conducting a mixed mode financial transaction. The system comprises a first device and a second device. The first device comprises a first processor, a first wireless transceiver coupled to the first processor, and a first contactless transceiver coupled to the first processor. The second device comprises a second processor, a second wireless transceiver coupled to the second processor, and a second contactless transceiver coupled to the second processor. The mixed mode financial transaction comprises communications between the first device and the second device through the first contactless transceiver and the second contactless transceiver, and further comprises communications between the first device and the second device through the first wireless transceiver and the second wireless transceiver.

Another embodiment of the invention is directed to a method of conducting a mixed mode financial transaction between a first device and a second device. The method comprises receiving, at a server computer, first interaction data from a first device, and receiving second interaction data from a second device. The first device comprises a first processor and a first motion sensor coupled to the first processor. The second device comprises a second motion sensor and a second processor coupled to the second motion sensor. The method further comprises determining whether the first device physically interacted with the second device with a server computer using sensor data from the first device and the second device. If the first device and the second device are determined to have physically interacted with each other, a first communication mode between the first device and the second device is established. A unique interaction token may be generated from the first interaction data and second interaction data. The unique interaction token may be transmitted to the first device and the second device, wherein the unique interaction token permits the first device and second device to initiate a second communication mode.

Another embodiment of the invention is directed to a server for facilitating a mixed mode financial transaction between a first device and a second device. The server comprises an input communication port for receiving first interaction data from a first device, and receiving second interaction data from a second device. The server further comprises an interaction determination module for determining whether the first device physically interacted with the second device with a server computer using interaction data from the first device and the second device. If the first device and the second device are determined to have physically interacted with each other, the server facilitates communication between the first device and the second device using a first communication mode. The server may generate a unique interaction token from the first interaction data and second interaction data. The unique interaction token may be transmitted to the first device and the second device, wherein the unique interaction token permits the first device and second device to initiate a second communication mode.

Another embodiment of the invention is directed to a server for facilitating a mixed mode financial transaction between a first device and a second device. The server comprises means for: receiving first accelerometer data from a first device, wherein the first device comprises a first processor and a first accelerometer coupled to the first processor; receiving second accelerometer data from a second device, wherein the second device comprises a second accelerometer and a second processor coupled to the second accelerometer; receiving a payment amount from at least one of the first device or the second device; and determining when the first device moves towards the second device with a server computer using accelerometer data from the first device and the second device; and if the first and second devices move towards each other, initiating a second mode of communication.

Exemplary Device Elements

Figure 6:
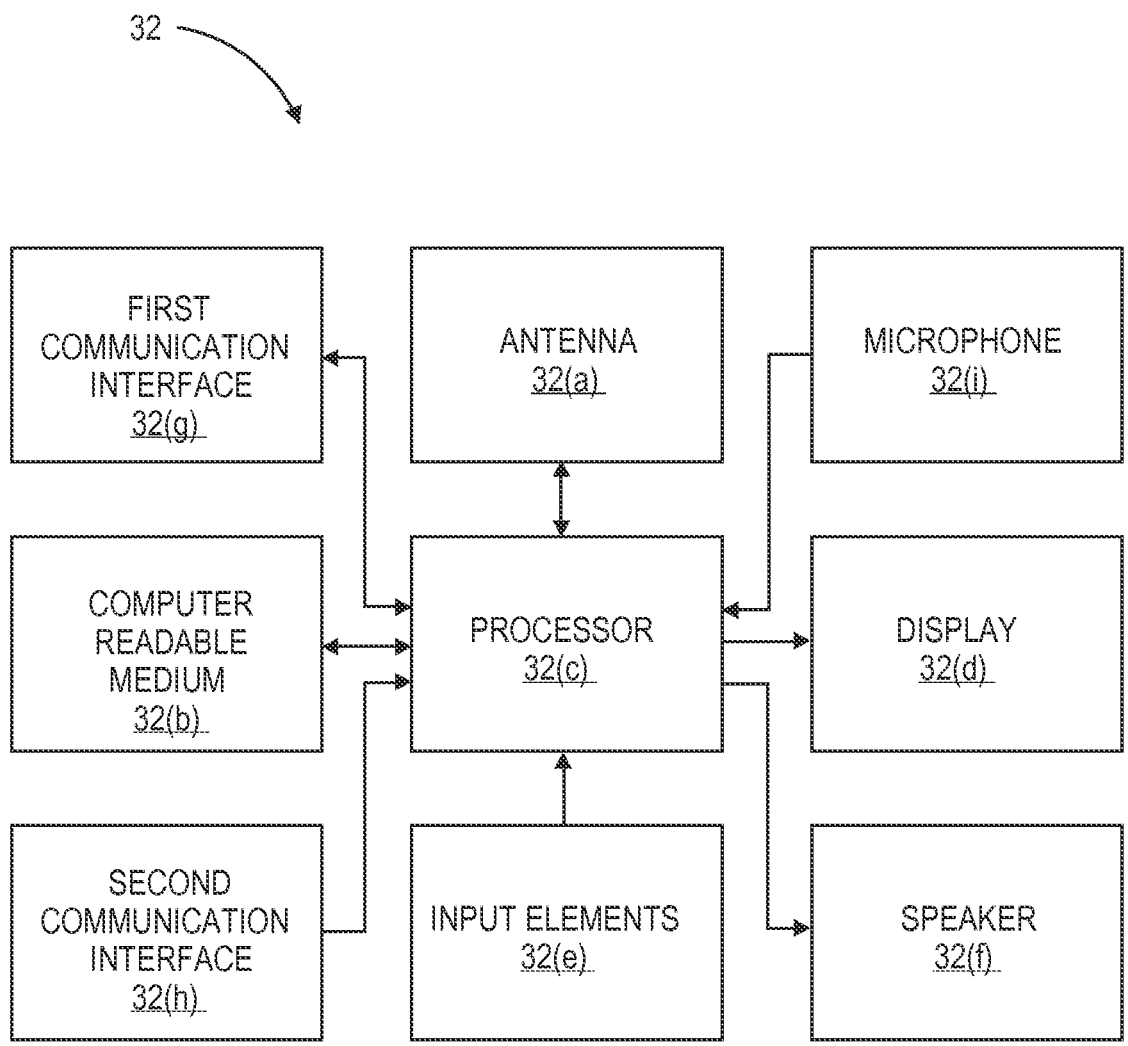
FIG. 6 shows a block diagram of a device in accordance with the present disclosure.

FIG. 6 shows a diagram of some components in an exemplary mobile device and a exemplary merchant device. It is understood that mobile devices and merchant devices of the present disclosure may have more or fewer of the elements shown in the illustrative figure.

An exemplary mobile device 32 in the form of a phone may comprise a computer-readable medium and a body. The computer-readable medium 32(b) may be present within the body (not shown), or may be detachable from it. The body may be in the form of a plastic substrate, housing, or other structure. The computer-readable medium 32(b) may be a memory that stores data and may be in any suitable form including a magnetic stripe, a memory chip, uniquely derived keys, encryption algorithms, etc. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the mobile device 32.

Information in the memory may also be in the form of data tracks that are traditionally associated with credit cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The mobile device 32 may further include a first communication interface 32(g). The mobile device 32 may further include a second communication interface 32(h).

The first communication interface 32(g) and the second communication interface 32(h) may comprise one or more of the following: a contactless element, a contact element, a WiFi transceiver, a Bluetooth transceiver, an infrared transceiver, or a cellular voice/data transceiver.

Contactless element may be implemented in the form of a semiconductor chip (or other data storage element) with an associated wireless transfer (e.g., data transmission) element, such as an antenna. Contactless element is associated with (e.g., embedded within) mobile device 32 and data or control instructions transmitted via a cellular network may be applied to contactless element by means of a contactless element interface (not shown). The contactless element interface functions to permit the exchange of data and/or control instructions between the mobile device circuitry (and hence the cellular network) and an optional contactless element.

The contactless element is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth, infra-red, or other data transfer capability that can be used to exchange data between the mobile device 32 and an interrogation device. Thus, the mobile device 32 is capable of communicating and transferring data and/or control instructions via both a cellular network and a near field communications line or network.

The contact element may comprise an integrated circuit card with embedded integrated circuits and may contain volatile memory and microprocessor components. In one embodiment, the contact element may be compatible with the EMV standard (Europay, MasterCard and VISA, a global standard for inter-operation of integrated circuit cards (IC cards or "chip cards")).

The first communication interface 32(g) and the second communication interface 32(h) may comprise a WiFi transceiver or a Bluetooth transceiver for wirelessly connecting electronic devices and communicating between devices.

NFC and Bluetooth are both short range high frequency wireless communication technologies that may be integrated with devices for communication between the devices. Typically, NFC can be used for two-way interactions between devices within a few centimeters range (e.g., 20 cm), whereas Bluetooth can be used for interaction between devices within a larger range (e.g., 10 m). NFC is a high frequency wireless communication technology based on inductive-coupling, where loosely coupled inductive circuits can be used to share power and data between devices in very short range. Bluetooth is a protocol for short range communication with a higher level of security. The setup time for NFC may be less compared to Bluetooth; however, the data transfer rate for Bluetooth may be faster. A WiFi access point (or hotspot) may have a range of about 20 meters (65 ft) indoors and a greater range outdoors.

The first communication interface 32(g) and the second communication interface 32(h) may comprise a cellular voice/data transceiver. For example, the cellular voice/data transceiver may use a network operated by a cellular service provider, (e.g., Edge, 3G, 4G, etc.)

The first communication interface 32(g) and the second communication interface 32(h) may comprise an infrared transceiver. Infrared (IR) light is electromagnetic radiation with a wavelength longer than that of visible light. IR may be used to transmit data in short-range communications among electronic devices. These devices usually conform to industry standards. The IR transmitter may use infrared light-emitting diodes (LEDs) to emit infrared radiation which is focused by a plastic lens into a narrow beam. The beam is modulated to encode the data. The receiver converts the infrared radiation to an electric current. Typically, IR does not penetrate walls and so does not interfere with other devices adjacent.

The mobile device 32 may also include a processor 32(c) (e.g., a microprocessor) for processing the functions of the mobile device 32 and a display 32(d) to allow a consumer to see phone numbers and other information and messages. The mobile device 32 may further include input elements 32(e) to allow a consumer to input information into the device. Input elements 32(e) include a touch screen interface, keyboard/keyboard, stylus, and the like.

Input elements 32(e) may also include motion sensors, such as accelerometers and gyroscopes. Motion sensors may be used in conjunction with the first communication interface 32(g) and the second communication interface 32(h) as appropriate, for example, in embodiments where one of the communication modes includes a physical interaction-based mode of communication. Input elements 32(e) may also include still or video cameras.

The mobile device 32 may further include a speaker 32(f) to allow the consumer to hear voice communication, music, etc., and a microphone 32(i) to allow the consumer to transmit her voice through the mobile device 32. The mobile device 32 may also include an antenna 32(a) for wireless data transfer (e.g., data transmission), and an accelerometer which can provide acceleration data to the processor 32(c).

Exemplary System Elements

The various participants and elements described may operate or use one or more computer apparatuses to facilitate the functions described herein. Any of the elements in FIGS. 1, 3A-C, and 4A-B may use any suitable number of subsystems to facilitate the functions described herein. Examples of such subsystems or components are shown in FIG. 7, which may illustrate parts of a computer apparatus.

Figure 7:
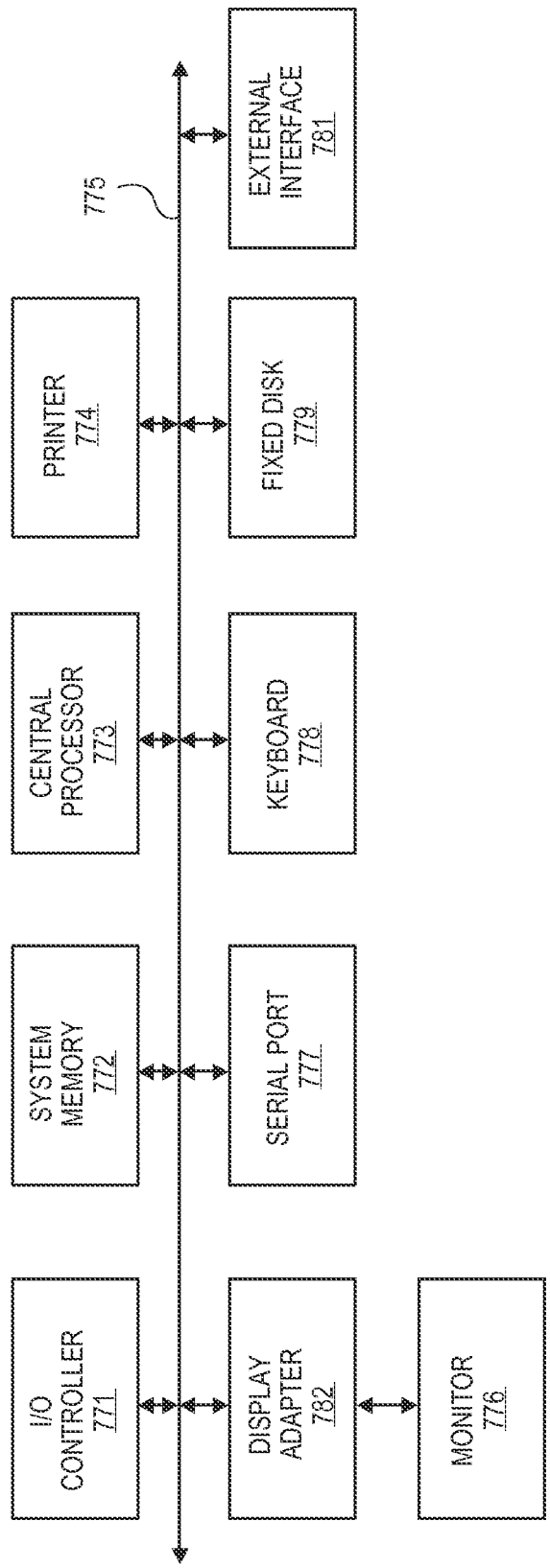
FIG. 7 shows a block diagram of a computer in accordance with the present disclosure.

The subsystems shown in FIG. 7 are interconnected via a system bus 775. Additional subsystems such as a printer 774, keyboard 778, fixed disk 779 (or other memory comprising computer-readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl, using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

What is claimed is:

1. A method of conducting a mixed mode financial transaction between a first device and a second device, the method comprising:

initiating, with the first device, the financial transaction using a first communication mode between the first device and the second device, wherein the first device and the second device are proximate to each other and are in a merchant store;

and wherein the first device is a consumer device and the second device is a merchant device;

exchanging data between the consumer device and the merchant device using the first communication mode, wherein a unique value is generated based on the data exchanged between the consumer device and the merchant device, wherein the data exchanged includes a consumer device identifier associated with the consumer device and a merchant device identifier associated with the merchant device;

authenticating the merchant device using the consumer device;

based on authenticating the merchant device, sending, by the consumer device, a transceiver activate message to instruct the merchant device to activate a transceiver associated with the merchant device to be used for a second communication mode, wherein the first communication mode and the second communication mode are different modes of communication;

initiating the second communication mode that is dependent on the data exchanged in the first communication mode and the unique value generated based on the data exchanged using the first communication mode, the unique value being a session key or a security token that secures the data exchanged in the second communication mode between the consumer device and the merchant device; and continuing the transaction by initiating, by the consumer device with the merchant device, an authorization request message comprising a payor PAN to request authorization of the transaction, wherein the consumer device and the merchant device are proximate to each other when communicating using the second communication mode, wherein the consumer and merchant devices are proximate when the first and second devices are within 10 meters of each other.

2. The method of claim 1, wherein the first communication mode comprises a wireless communication mode based on a physical interaction between the consumer device and merchant device.

3. The method of claim 1, wherein the second communication mode comprises a short range wireless communication mode.

4. The method of claim 3, wherein the short range wireless communication mode uses NFC technology.

5. The method of claim 1, wherein the merchant device is a merchant access device and the consumer device is a consumer's mobile phone.

6. The method of claim 5, wherein the consumer's mobile phone comprises an RFID reader for reading product information of products offered by a merchant.

7. The method of claim 1, wherein the first communication mode comprises NFC communication mode and the second communication mode comprises a Bluetooth communication mode.

8. The method of claim 1,
wherein one of the first communication mode or the second communication mode is initiated based on a physical interaction caused by physical contact measured by a first motion sensor on the consumer device and a second motion sensor on the merchant device such that the consumer device generates first interaction data representative of the physical contact and the merchant device generates second interaction data representative of the physical contact, wherein a processor analyses first interaction data and second interaction data to determine whether the consumer device and the merchant device physically interacted, and wherein the other of the first communication mode or the second communication mode of communication uses a short range wireless mode of communication.

9. The method of claim 1 wherein authenticating occurs using a remote server.

10. The method of claim 1 wherein the unique value is used to tie the consumer device and the merchant device together.

11. The method of claim 1 wherein the session key is used as a single-use key to encrypt communications using the second communication mode.

12. The method of claim 1 further comprising:
receiving an authorization response message.

13. The method of claim 1 further comprising:
completing the transaction using a third mode of communication.

14. The method of claim 1, wherein the unique value is further based on interaction data comprising accelerometer data, location coordinates, and a time stamp produced by the first device.

15. The method of claim 1, wherein the consumer and merchant devices are proximate when the devices are within 20 centimeters of each other.

16. A mobile device comprising:
a processor;
a memory coupled to the processor;
a first communication interface configured to exchange data with a merchant device, wherein a unique value is generated based on the data exchanged with the merchant device, wherein the data exchanged includes a consumer device identifier associated with the mobile device and a merchant device identifier associated with the merchant device, and wherein a transaction at the merchant device is initiated by sending first transaction data using a first communication mode via the first communication interface; and
a second communication interface comprising a transceiver configured to be activated after the merchant device is authenticated by the mobile device to be used for a second communication mode; and
the second communication interface configured to be initiated dependent on the data exchanged in the first communication mode and the unique value generated based on the data exchanged using the first communication mode, the unique value being a session key that secures the data exchanged in the second communication mode between the mobile device and the merchant device, wherein the transaction continues by initiating an authorization request message comprising a payer personal account number to request authorization of the transaction via second communication interface and wherein the mobile device and the merchant device are proximate to each other, wherein the second communication mode comprises a short range wireless communication mode.

17. The mobile device of claim 16, wherein the first communication mode comprises a wireless communication mode based on a physical interaction between the mobile device and merchant device.

18. The mobile device of claim 17, wherein interaction data representative of the physical interaction between the mobile device and merchant device is recorded by a first accelerometer in the mobile device and a second accelerometer in the merchant device.

19. The mobile device of claim 18, wherein, if the second accelerometer detects an amplitude of movement above a predetermined threshold, a RF transceiver on the second device is activated and placed into transmit mode.

20. The mobile device of claim 16, wherein the sending of the first transaction data and sending second transaction data in the second communication mode occur substantially simultaneously.

21. The mobile device of claim 16, wherein establishing the first communication mode between the mobile device and the merchant device occurs at a merchant location before a consumer selects items to purchase.

22. The mobile device of claim 21, wherein the mobile device is a consumer mobile phone with a RFID reader configured to read product RFID tags and wherein the consumer mobile phone receives product information based on the product RFID tags using the second communication mode.

23. The mobile device of claim 22, wherein a transaction receipt is transmitted using the second communication mode after at least one product RFID tag has been read by the consumer mobile phone.

24. The mobile device of claim 16, wherein the merchant and mobile devices are proximate when the devices are within 10 meters of each other.

25. The mobile device of claim 16, wherein the unique value is further based on interaction data comprising accelerometer data, location coordinates, and a time stamp produced by the mobile device.

* * * * *